Aug. 11, 1936. P. A. E. HELLIGE 2,050,608
COLORIMETER
Filed June 25, 1934 2 Sheets—Sheet 2
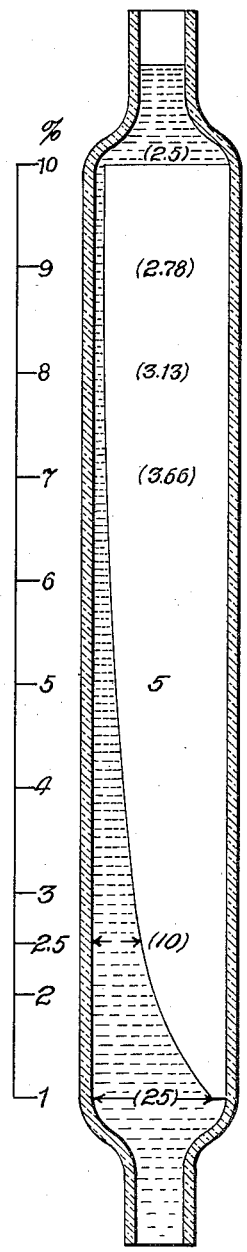
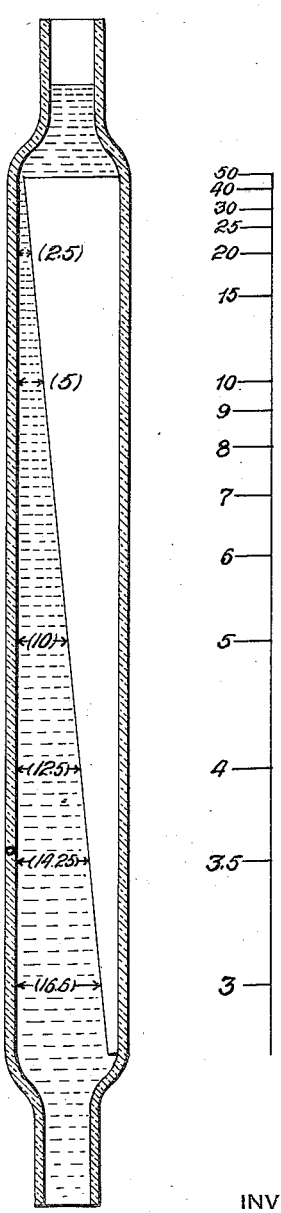
INVENTOR
PAUL A. E. HELLIGE
BY J.S. Wooster
ATTORNEY Patented Aug. 11, 1936

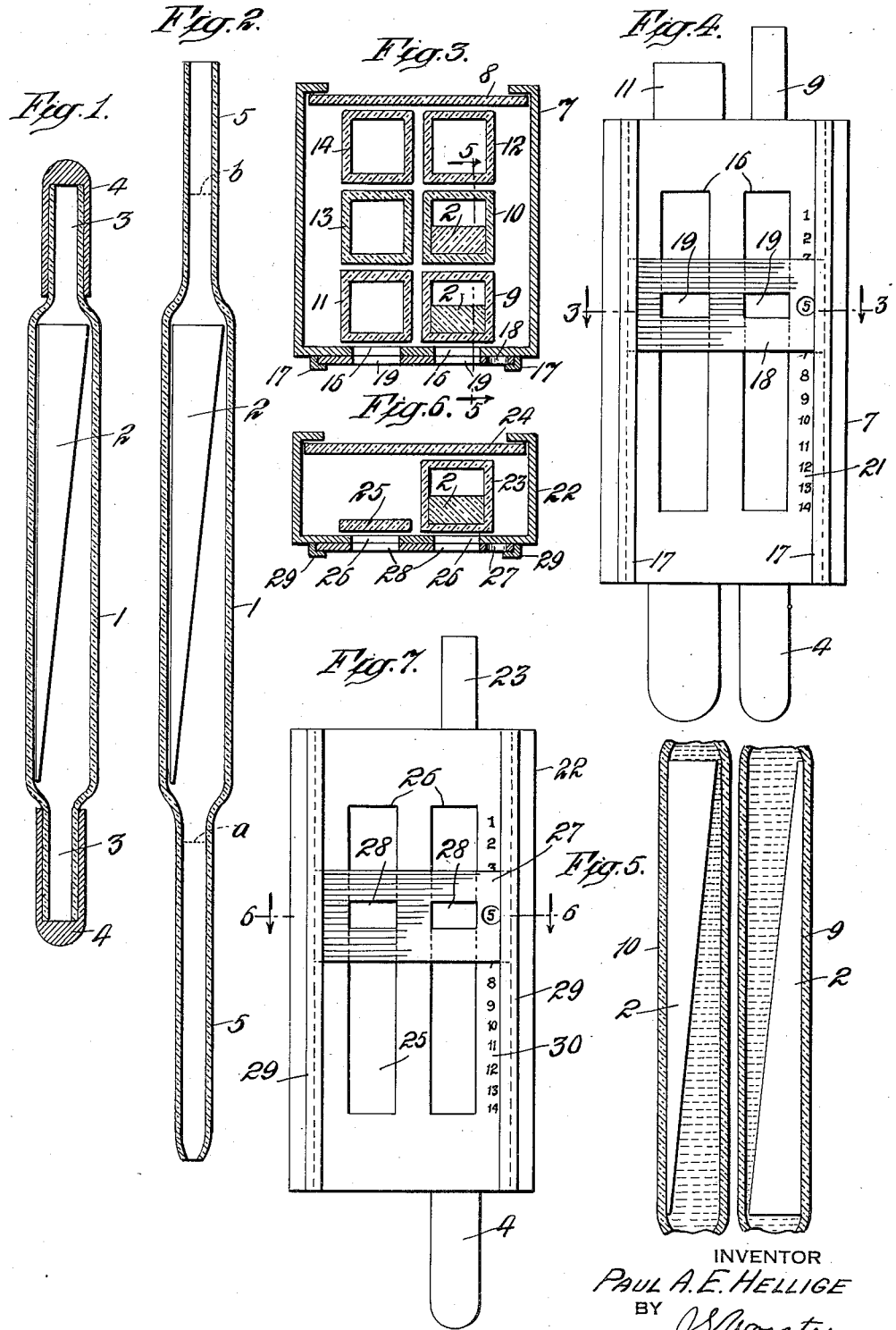

2,050,608

UNITED STATES PATENT OFFICE 2,050,608

COLORIMETER

Paul A. E. Hellige, Jackson Heights, N. Y.

Application June 25, 1934, Serial No. 732,201

9 Claims. (Cl. 88—14)

This invention relates to wedge type colorimeters such as are used for measuring hydrogen ion concentrations, the determination of haemoglobin, or for general colorimetric purposes, and has for its object to increase the accuracy of such devices and reduce the amount of care and skill required in their operation.

A simple wedge colorimeter such as is used for the determination of haemoglobin, sugar, albumin, etc., usually comprises a wedge-shaped glass cell made of glass plates cemented together and used to hold either the standard or test solution, and a plain glass tube or cell which is mounted adjacent the wedge and is used to hold the other of the two solutions. When the wedge is used for the test solution, a standard glass color plate is frequently employed instead of a standard colored solution. The operator gazes through a window at the color standard and the test solution and raises and lowers either the test solution or the window until the color of the test solution exactly matches that of the standard, and then takes a reading from a scale associated with the colorimeter. Similar wedges are used for measuring hydrogen ion concentrations although a different method of comparison is employed as hereinafter described.

One disadvantage of cemented glass wedges is that they are difficult and expensive to make, especially in small sizes. Another disadavantage is that most cements are attacked by acids, alkalies, alcohol, ether or other substances used in the wedge, with the result that the wedge is relatively short lived. It has been proposed to place the test solution in a plain vessel and to seal the standard solution in a round tube containing a solid glass wedge which would give the comparison liquid a wedge-like shape and at the same time protect it from contamination. I have found, however, that such combination of a round tube and solid wedge is very unsatisfactory because all portions of the tube on either side of a theoretical longitudinal center line give different color intensities, making it impossible to obtain accurate color comparisons.

I overcome the foregoing disadvantages by employing a rectangular tube and a transparent solid wedge, preferably of rectangular cross-section, which fits into the tube and forms therewith a liquid receptacle which gives the liquid a rectangular cross-section and hence a uniform color intensity throughout the width of the tube at any given depth. The tube is molded over a suitable form and contains no cement. The wedge may be straight-edged but for general colorimetric purposes I also provide a wedge of rectangular cross-section which is curved in accordance with a logarithmic scale thereby enabling the result to be taken directly from a linear reading scale. Another feature of the invention resides in providing the rectangular tube with reduced open ends which position and seal the wedge in the tube and may also serve as a mixing pipette enabling the reaction color to be obtained by suction in the tube itself instead of transferring the liquid to the tube after making the reaction or a proper dilution thereof. I prefer to make these reduced ends round so that they may readily be closed by removable flexible nipples or the like.

The ends of the tubes may, of course, be fused for permanent storing of standard solutions but in many cases it is preferable to use open tubes for the standard as well as the test solution. This is especially so in the case of hydrogen ion measurements since the acid and alkali forms of an indicator are not stable and should be replaced from time to time. Open tubes may furthermore be used for any indicator for the complete pH range, which is from 0 to 14 pH, while sealed tubes are only useful for the limited range of one indicator which does not exceed 2 full pH units out of the complete range of 14.

The above and other features and advantages of the invention will be described in connection with the accompanying drawings, in which:

Fig. 1 is a longitudinal sectional view of a wedge tube embodying my invention;

Fig. 2 is a similar view of a modified tube embodying a mixing pipette;

Fig. 3 is a transverse section on line 3—3 of Fig. 4, showing a hydrogen ion comparator embodying the invention;

Fig. 4 is a front view of the device shown in Fig. 3;

Fig. 5 is a longitudinal section taken on line 5—5 of Fig. 3;

Fig. 6 is a transverse section on line 6—6 of Fig. 7, showing a device suitable for haemoglobin or general colorimetric determinations;

Fig. 7 is a front view of the device shown in Fig. 6;

Fig. 8 is a longitudinal sectional view of a modified container employing a curved wedge in association with a linear reading scale;

Fig. 8a is a similar view of a container employing a straight wedge in association with a logarithmic scale; and Fig. 8b is a diagrammatic representation of a standard color value used in interpreting Figs. 8 and 8a.

The container shown in Fig. 1 comprises a rectangular tube 1 composed of transparent material, preferably glass, containing a solid wedge 2 also made of glass or other transparent material. The tube may be formed by molding the glass over a suitable form of square or other rectangular cross-section. The tube may be closed at the bottom and left open at the top for filling, or, as shown in Fig. 1, may have extensions 3 of reduced cross-section fused or otherwise formed on both ends after the wedge is in place. The extensions act as positioning stops for the wedge and furthermore enable the tube to be filled by suction. The extensions 3 are preferably round in cross-section so that they may be conveniently closed as by means of rubber nipples 4.

The container shown in Fig. 2 is similar to that described above except that it is provided with elongated extensions 5 which constitute mixing chambers, giving the tube a pipette shape. This construction is advantageous for color measurements of solutions which produce a definite color by adding a reagent, as in making haemoglobin determinations. In such case the blood may be sucked up to the lower point $a$ in Fig. 2, after which hydrochloric acid together with the blood may be sucked up to the upper point $b$. The result is a mixture of brown color prepared directly in the tube, avoiding preparation of the mixture in a separate tube or so-called diluting pipette as has been customary heretofore.

The colorimeter shown in Figs. 3 and 4 is suitable for measuring hydrogen ion concentrations or for general colorimetric measurements involving one, two or more color components as comparison color. In the case of hydrogen ion measurements, for example, it is well known that if a suitable dye, commonly called an "indicator", is added to an acid or alkaline solution, it will change its color according to the degree of acidity of the solution to which it is added. The indicator bromthymol blue, for example, in an acid solution of or below pH 6.0 has a yellow color; in an approximately neutral solution, pH 7.00, a green color; in alkaline solutions with a pH 7.6 or higher, a blue color; and yellowish green or greenish blue colors in solutions between these end points of the pH range. Thus the indicator produces a color scale of all possible color combinations of the colors yellow and blue.

In order to produce the above color scale as a means for color comparison in hydrogen ion measurements, it has heretofore been customary to fill a hollow glass wedge with the yellow "acid form" of the indicator and a second hollow glass wedge with the blue "alkaline form" of the indicator. Both wedges, arranged in such a position that the wider part of one wedge faces the narrow part of the other, show the observer the added colors of the acid (yellow) and alkaline (blue) forms of the indicator as a continuous color scale from yellow to blue with varying yellow and blue intensity and therefore in all possible color mixtures for these two colors. Individual wedges for the acid and alkaline forms, or so called double wedges (consisting of a rectangular glass cell with a diagonal partition forming two equal wedge-shaped compartments) are, however, costly to manufacture and are furthermore undesirable because strong acid or alkaline solutions have a deleterious effect upon the material with which the plates of the wedges are cemented together.

These objections are eliminated in the hydrogen ion comparator of Figs. 3 and 4, comprising a housing 7 having a rear milk glass plate 8 for diffusing light, wedge tube 9 for one color component, wedge tube 10 for the second color component, tube 11 for the test solution, tube 12 containing test solution for offsetting the original color or turbidity of the test solution in tube 11, and tubes 13 and 14 containing water to compensate the optical effect of the solutions and wedges in the wedge tubes 9 and 10. For hydrogen ion measurements wedge tube 9 will contain the acid yellow color of the indicator bromthymol blue, assuming that this indicator is used for the test, wedge tube 10 will contain the blue alkaline color, and tube 11 will contain the test solution with the added indicator. Wedge tubes 9 and 10 may be of the type shown in Fig. 1, while the other tubes may be plain rectangular tubes fused at the bottom and open at the top. The housing 7 has two spaced vertical openings 16 at the front and is provided at the sides with vertical angles 17 forming a track for a slider 18 having openings 19 which register with openings 16 in the housing. Openings 16 and 19 are preferably of such width and so positioned as to lie within the side edges of the adjacent tubes 9 and 11, thereby affording a clear view of the contents of the tubes without permitting a view of their side walls. The slider 18 is moved up and down in its track until a section of wedge tubes 9 and 10 is found which is identical in color with the test solution in tube 11. Instead of the tubes 9 and 10 being stationary they may be moved up and down, in which case the observation opening would be in a definite fixed position in the front of the housing. The reading of the result is made with the aid of a scale 21 located at the side of the housing and calibrated in any suitable manner.

For general colorimetric determination either the test solution or the comparison solution may be housed in the wedge tube. A test solution in the wedge tube may be compared against a transparent color plate, preferably of colored glass, as shown in Figs. 6 and 7 wherein 22 is the housing containing a pipette wedge tube 23 of the type shown in Fig. 2, 24 is the diffusing plate, 25 the transparent color plate, 26 the vertical openings in the housing, 27 a slider with openings 28 in alignment with openings 26 of the housing, 29 the vertical angles for holding the slider, and 30 the scale.

In a haemoglobin determination, for example, blood previously diluted with hydrochloric acid may be sucked up in the wedge tube, or the mixture may be made directly in the wedge tube as explained in the foregoing description of Fig. 2, after which the wedge tube is inserted in the colorimeter housing. Depending on a lower or higher haemoglobin content of the blood, a lighter or darker mixture is obtained which is matched with the uniformly colored plate 25. If the wedge is in the position shown in Figs. 1 and 2 with the wide part of the wedge at the top of the tube a color match will be obtained in the upper part of the wedge with mixtures of high haemoglobin content, and a color match will be obtained in the lower part of the wedge with mixtures of low haemoglobin content. This is due to the fact that a deeper colored solution will produce in a narrower stratum the color of the color plate, while for lighter colored solutions a greater stratum is necessary to produce the same color. The thickness of the stratum may be indicated by any suitable scale.

The rectangular tube shown in Fig. 8 contains a modified form of wedge which is curved according to a logarithmic scale, while that of Fig. 8a contains a straight wedge of the type previously described. When the straight wedge-shaped solution of Fig. 8a is compared against a standard solution or standard color plate with a definite color value, for example 5% as shown in Fig. 8b, and a color match is obtained at the scale interval 5 (representing a liquid depth for example 10 mm.), a test solution having a concentration of 10% would match the standard at the scale interval 10 since the depth of the stratum at this part of the wedge is one-half of the stratum at the scale interval 5, namely, 5 mm. Consequently a test solution of 20% would match the color of the standard at the scale interval 20, which corresponds to a stratum of 2.5 mm. Test solutions having other concentrations, for example, 3, 3.5 and 4% would match the color of the standard at other wedge parts, namely, as indicated in Fig. 8a at wedge parts with a stratum of 16.6, 14.25 and 12.5 mm. From this it is evident that the reading scale for a straight wedge such as shown in Fig. 8a is not linear, but logarithmic. In using a wedge of this type for producing a color scale of the test solution, the reading accuracy is much smaller for higher values, where the calibrations of the scale are much closer together, than in the lower portion of the scale where the depth of the liquid is much greater. In order to overcome this I provide the curved wedge of Fig. 8 having a curvature which corresponds to the logarithmic reading scale shown in Fig. 8a. If, for example, a test solution matches the color of a standard solution or standard color plate of definite color value representing a 5% solution at the scale interval 5 where the curved wedge produces a stratum of 5 mm., a test solution with a concentration of 2.5% will match the standard at a point where the stratum of the solution in the wedge is 10 mm. Consequently a test solution having a concentration of for instance 1, 7, 8, 9, or 10% will match the standard at wedge points with a stratum of 25, 3.66, 3.13, 2.78, and 2.5 mm. as indicated in Fig. 8. Hence when the wedge is curved in accordance with a logarithmic scale, the reading scale for such a wedge tube is linear as shown in Fig. 8. This scale permits the same reading accuracy throughout the whole scale as the distances between each unit are exactly the same.

Various changes may be made in the structures and methods of use herein shown and described without departing from the scope of the invention as defined in the appended claims.

The invention claimed is:

1. A colorimeter comprising a transparent rectangular container and a curved transparent wedge of rectangular cross-section within said container and forming therewith a wedge-shaped liquid receptacle of rectangular cross section, and a scale associated with said colorimeter to indicate the color value of the various strata, said wedge having a curvature corresponding to a logarithmic function of said scale.

2. A colorimeter comprising a transparent rectangular container and a curved transparent wedge of rectangular cross-section fitting into said container and forming therewith a wedge-shaped liquid receptacle of rectangular cross-section, said wedge having a curvature corresponding to a logarithmic scale whereby readings of various strata of a colored solution in said receptacle may be represented by a linear scale.

3. A colorimeter comprising a transparent rectangular container, a curved transparent wedge of rectangular cross-section within said container and forming therewith a wedge-shaped liquid receptacle of rectangular cross-section, and a linear scale associated with said colorimeter, said wedge having a curvature corresponding to a logarithmic function of said linear scale.

4. A colorimeter comprising a container having a transparent rectangular portion, and reduced open ends, and a transparent wedge sealed in said rectangular portion by said reduced ends and forming a wedge-shaped liquid receptacle.

5. A colorimeter comprising a container having a transparent rectangular portion and reduced open ends, a transparent wedge sealed in said rectangular portion by said reduced ends and forming a wedge-shaped liquid receptacle, and means for closing said ends.

6. A colorimeter comprising a container having a transparent rectangular portion and reduced open ends of circular cross-section, a transparent wedge sealed in said rectangular portion by said reduced ends and forming a wedge-shaped liquid receptacle, and removable flexible nipples for closing said ends.

7. A colorimeter comprising a pipette-shaped container having a transparent rectangular portion adapted to contain a colored liquid and elongated end portions for introducing and mixing said liquid, and a transparent wedge within the rectangular portion of said container to form a wedge-shaped space for the liquid.

8. A colorimeter comprising a pipette-shaped container having a transparent rectangular portion adapted to contain a colored liquid and elongated end portions of reduced width for introducing and mixing said liquid, and a transparent wedge sealed in the rectangular portion of said container by said end portions and forming a wedge-shaped space for the liquid.

9. A colorimeter comprising a pipette-shaped container having a rectangular molded glass body adapted to contain a colored liquid and elongated circular glass end portions of reduced width for introducing and mixing said liquid, and a solid glass wedge of rectangular cross-section disposed in said body and forming a wedge-shaped space for the liquid.

PAUL A. E. HELLIGE.